United States Patent [19]

Kluck

[11] Patent Number: 4,596,941
[45] Date of Patent: Jun. 24, 1986

[54] ELECTRIC MOTOR

[75] Inventor: Albert Kluck, Sersheim, Fed. Rep. of Germany

[73] Assignee: ITT Industries, Inc., New York, N.Y.

[21] Appl. No.: 519,863

[22] Filed: Aug. 3, 1983

[30] Foreign Application Priority Data

Aug. 18, 1982 [DE] Fed. Rep. of Germany ....... 3230666

[51] Int. Cl.$^4$ ............................................. H02K 13/00
[52] U.S. Cl. ...................................... 310/239; 310/43; 310/89; 310/91
[58] Field of Search ............... 310/239, 240, 241, 242, 310/244, 245, 246, 247, 229, 230, 231, 89, 91, 43, 229, 230, 238

[56] References Cited

U.S. PATENT DOCUMENTS

| 2,105,926 | 1/1938 | Mueller | 310/241 |
| 2,475,276 | 7/1949 | Briggs | 310/240 |
| 3,219,860 | 11/1965 | Redick et al. | 310/240 |
| 3,242,362 | 3/1966 | Ciliax | 310/240 |
| 3,270,230 | 8/1966 | Schultz | 310/244 |
| 3,628,075 | 12/1971 | Dafler | 310/239 |

FOREIGN PATENT DOCUMENTS

| 871336 | 3/1953 | Fed. Rep. of Germany | 310/241 |
| 1206075 | 12/1965 | Fed. Rep. of Germany | 310/240 |
| 2743359 | 4/1979 | Fed. Rep. of Germany | 310/240 |
| 569351 | 5/1945 | United Kingdom | 310/240 |
| 951366 | 3/1964 | United Kingdom | 310/240 |

Primary Examiner—R. Skudy
Attorney, Agent, or Firm—Donald J. Lenkszus

[57] ABSTRACT

An electric motor includes an end wall having a collector mounted therein. The brushes of the motor are affixed to spring levers resiliently mounted on the end wall. The end wall includes a diaphragm-like portion having a release pin extending radially inward. The spring lever with the affixed motor brush is maintained in a mounting position by contact with a holding pin. After the assembly of the collector between the brushes, the diaphragm is compressed to push the release pin into the lever. The lever is freed from contact with the holding pin and is released to allow the brush to contact the collector.

20 Claims, 7 Drawing Figures

U.S. Patent   Jun. 24, 1986   4,596,941
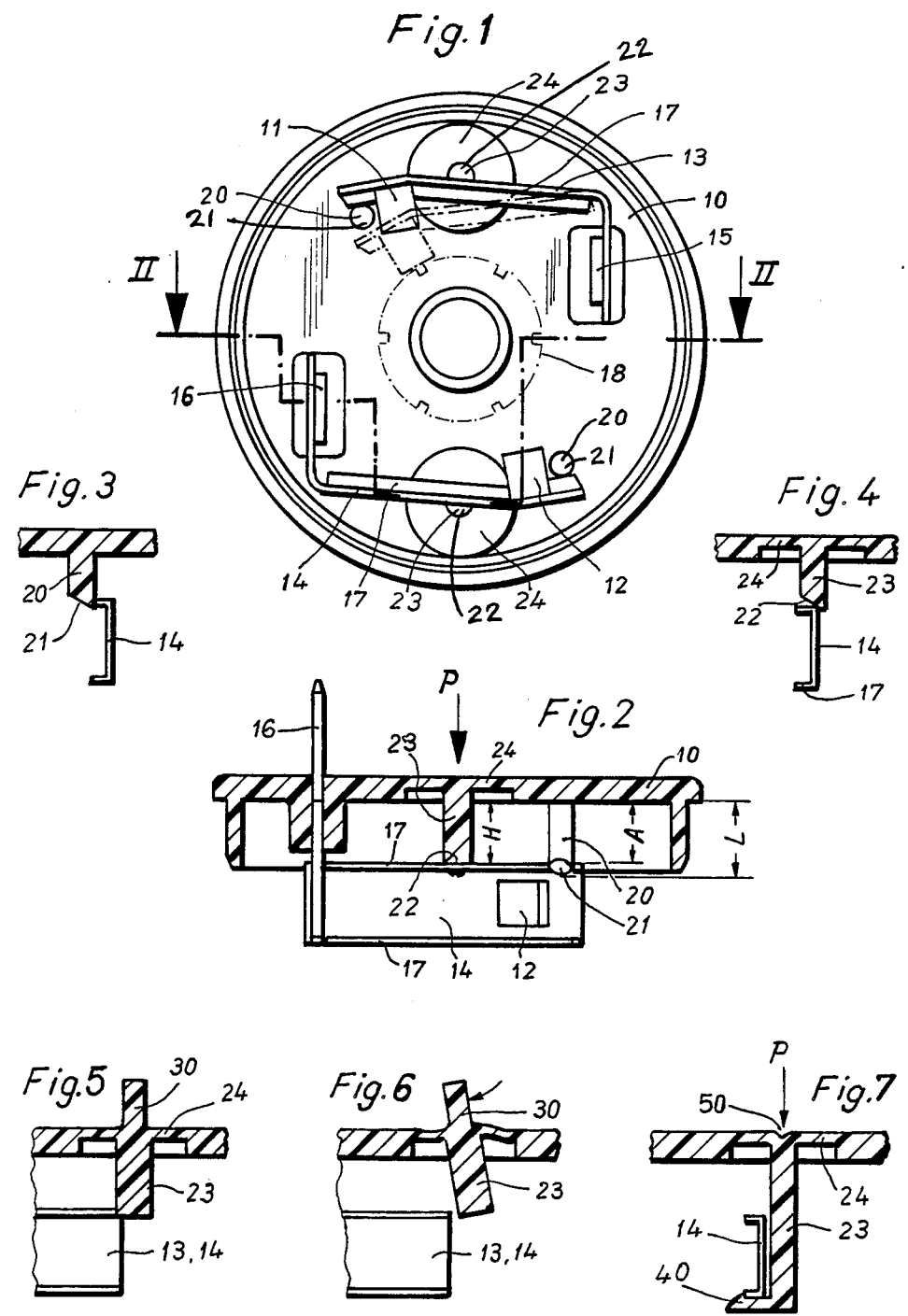

ELECTRIC MOTOR

BACKGROUND OF THE INVENTION

This invention pertains, in general, to an electric machine having an armature rotatably mounted in a housing, a collector, and one or more brushes; and in particular to electric motors.

In the final assembly of machines of this kind, it is a problem to bring the collector between the brushes which are resiliently prestressed towards the collector sliding path in as simple and time saving a way as possible. Usually the brushes are, for this purpose, arrested in a mounting position such that they are spaced apart from the collector sliding path, when the collector has been brought into its final position. When the armature with the collector is mounted, the brushes are released so that the brushes can fly back on the collector sliding path. Such a method of assembly has for example, been described by the German specifications AS No. 1 206 075 or OS No. 2 743 359. According to these known methods, the brushes are released from the mounting position by a tool, for example, a rod or a hook, which has to be inserted into the interior of the housing through a bore in the housing wall. Such an assembly is time consuming and complicated. A further disadvantage is that the motor housing must have an opening for this tool and thus moisture can get into the interior of the motor, unless these openings are closed later during a further phase of operation. In addition, a tool is needed for the assembly of the motor on each assembly station; this makes the production of the motor more expensive, even if this tool is a simple wire rod.

SUMMARY OF THE INVENTION

It is one object of the present invention to provide an electric machine designed to make assembly as simple and time saving as possible without any tool and to provide that the machine, after its final assembly, is impermeable to water without additional phases of operation.

The invention is thereby based on the idea that one can transmit from the outside of the housing to the interior the displacement necessary to release the brushes which are arrested in the mounting position, even if the housing is tight and has no bore in one wall, if in accordance with the invention the housing wall is diaphragm-like and transmits the movement of the diaphragm-like housing portion onto the means for locking the brushes in the mounting position.

The diaphragm-like portion can in accordance with the invention be provided on each suitable housing wall. In a preferred embodiment this diaphragm-like portion is provided on the end shield, because the end shield of many types is made of plastic material and the wall thickness of a plastics housing wall can be reduced in sections by a simple design of the tool. The invention may also be applied to machines in which the brushes are guided in a brush holder radially to the collector. Particularly, the invention can be applied to machines of a kind in which the brush is fastened on a lever which is swivelably mounted on an end shield so as to permit the brush to fly back radially to the collector jacket surface. In an embodiment of this kind, the locking means and thus the means to release this locking can be effective in axial direction and therefore, be easily arranged on the plastics end shield.

In the known versions mentioned hereinabove, a detent holding the brush in the mounting position is adjusted by the tool, so that the brush lever is released. This arrangement can be combined with the basic idea of the invention such that a detent is moved out of the swiveling range of the brush lever by a displacement of the diaphragm-like portion.

In an especially preferred embodiment the locking is released according to another principle. In this case, it is not the detent which is moved by the displacement of the diaphragm-like portion, but the brush lever is moved in a direction deviating from its swiveling direction, so that the detent no longer cooperates with the brush lever. This embodiment can be realized by the very simple design as will be described below.

BRIEF DESCRIPTION OF THE DRAWINGS

The invention may be better understood from a reading of the following description of the embodiments in conjunction with the drawing, in which:

FIG. 1 is a view of the inside of an end shield;

FIG. 2 is a section through the end shield taken on the line II—II in FIG. 1;

FIG. 3 is a partial section in the area of a holding pin;

FIG. 4 is a partial section in the area of a release pin;

FIG. 5 is a partial section through an end shield of another embodiment with a brush in the mounting position;

FIG. 6 is a partial section similar to FIG. 5 but with the brush in the operating position, and FIG. 7 is a partial section through an end shield of a third embodiment.

DETAILED DESCRIPTION

In FIGS. 1 and 2 an end shield is designated by a circular outer contour. The end shield closes the front side of a cup-shaped motor housing which is not shown in detail. The brushes 11 and 12 are each fastened on a brush lever 13 and 14, respectively, which in the embodiment shown has the shape of a leaf spring and which is a resilient material having spring like properties.

These leaf springs are fixed on plug connections 15 and 16, respectively, which penetrate the wall of the end shield 10. In order to increase their stability, these leaf-spring-like resillient brush levers 13 and 14 have bent portions designated 17. Thus, each brush 11 and 12 is fixed on a lever 13 and 14, respectively, which is swivelably mounted on the end shield in such a way as to permit the brush to fly back radially onto the collector jacket surface 18, as shown by broken lines in FIG. 1.

FIGS. 1 and 2 show the brushes 11 and 12 in the mounting position in which they are arrested at a spacing from the collector 18. Holding pins 20 perpendicularly projecting from the end shield 10 serve to arrest the brushes in the mounting position. The length L of each holding pin 20 is dimensioned such that, as seen in the axial direction, it extends slightly into the swiveling range of the respective brush lever 13 and 14. Each holding pin 20 has an inclined front face 21 as most clearly shown in FIG. 3. When the brush lever 13 or 14 is swiveled to the outside from the operating position shown in broken lines in the upper part of FIG. 1 into the mounting position shown in solid lines in FIG. 1 and in FIG. 2, the end of the brush lever 13 and 14 respectively meets inclined surface 21 of pin 20, rides up inclined surface 21, and then drops by its own spring action due to its resiliency behind the holding pin 20 into the position shown in FIGS. 2 and 3. The holding pin 20 arrests the brush lever in the mounting position as most clearly shown in FIG. 3. In this mounting position, the brush lever 13 or 14 respectively rests upon the front face 22 of the release pin 23 as clearly shown in FIG. 4. Face 22 also has an inclined surface which increases from the inside to the outside in an approximately radial direction as clearly shown in FIG. 4. From FIGS. 2 and 4 it can be seen that each release pin 23 is integrally formed on a circular portion 24 of the end shield 10, which has a relatively thin wall thickness and is therefore formed like a diaphragm. By exerting a pressure onto this diaphragm-like portion 24 in the direction of arrow P in FIG. 2, release pin 23 is thus displaced in the axial direction, whereby the brush lever 14 is also moved in the axial direction. As soon as the spacing A between the brush lever 14 and the end shield 10 in the point of the holding pin 20 is greater than the length L of this holding pin 20, brush lever 14 is released and the brush can fly back on the collector jacket surface 18. By displacement of the diaphragm-like portion 24 from its rest position, the brush lever 14 is moved in a direction deviating from its swiveling direction and thereby releases the brush lever from its locked position without needing a separate tool for this purpose, which would have to be inserted through a bore in the housing wall.

The following features are of particular significance. The inclined front face 21 on the holding pin 20 serves as a starting incline for the brush lever, when the latter is brought into its mounting position. During the movement into the mounting position, an axially directed force is automatically exerted on the leaf spring creating a tension in the leaf spring, so that it automatically flies back behind the holding pin. The height H of release pin 23 is chosen such that after the axial flying back of the brush lever 14, it rests with a prestress on the front face 22 of the release pin 23. It is thereby ensured that even in the case of unavoidable tolerance deviations only a small lift of the diaphragm-like portion is necessary to release the locking, because in the mounting position no gap is left between the front face 22 of the release pin 23 and the brush lever 14. The inclined front face 22 of the release pin 23 provides that the brush lever flies back to the operating position reliably if the axial prestress of the brush lever is relatively high in comparison with the radial prestress. The release pin 23 is arranged between the clamping point of the leaf spring at the plug connection 15 and the holding pin 20. By so positioning the pin 23 only a small lift at the diaphragm-like portion 24 provides a relatively large displacement motion of the brush lever in the area of the holding pin 20.

FIGS. 5, 6 and 7 show embodiments in which the release pin simultaneously serves as a holding pin. By exerting pressure on the outside of the end shield 10 in the area of the diaphragm-like portion, a detent is moved out of the swiveling range of the brush lever, so that the lever can spring from its mounting position into the operating position. Thus, in these versions it is not the brush lever, but a detent which is displaced.

In the embodiment according to FIGS. 5 and 6, the holding and release pin 23 has an outer stud 30, which serves as a handle for displacing the pin. The pin 23 is arranged relative to the brush lever 14 that in the operating position of the diaphragm-like portion 24 in a tangential direction it slightly projects into the swiveling range of the brush lever. By a swiveling movement of the pin 23 the locking can be released, as shown in FIG. 6. In the embodiment according to FIGS. 5 and 6 the pin could also be provided with a pocket bore into which a tool could be entered, so that the swiveling movement of the pin could be effected with a smaller amount of force.

FIG. 7 shows an embodiment in which the pin 23 is provided with a detent 40 encompassing the brush lever 14 from below. Detent 40 is moved out of the swiveling range of the brush lever by a pressure exerted on the diaphragm-like portion in the axial direction.

In the embodiments shown, the diaphragm-like portion 24 is circular and carries the release pin 23 at its center. In this center, a notch 50 can be arranged, as shown in FIG. 7, such that from outside it can easily be seen at which point pressure on the outer surface of the end shield has to be exerted.

The diameter of the circular, diaphragm-like portion 24 is chosen in a way by taking into consideration the elasticity of the material used for the end shield so that a sufficent lift is possible without a great amount of force while ensuring, on the other hand, a sufficient stability of the end shield 10. If sufficiently elastic material is used for the end shield 10, it is possible to eliminate the reduced wall thickness section in which case the entire surface of the end shield serves in fact as a diaphragm.

What is claimed is:

1. An electric motor comprising:
   a housing,
   a collector mounted in said housing,
   a wall comprising an end shield of said housing,
   a lever affixed to said wall and a motor brush mounted on said lever, said lever being biased to urge said brush into contact with said collector,
   means for holding said lever in a mounting position,
   a release pin projecting from a portion of said wall, said wall portion being movable such that upon the compression of said wall portion, said release pin contacts said lever thereby radially moving said lever from contact with said means for holding said lever in said mounting position and permitting said brush to contact said collector.

2. The motor of claim 1 wherein said means for holding said lever in a mounting position comprises a holding pin projecting from said wall into the swivelling range of said lever.

3. The motor of claim 2 wherein upon the compression of said wall portion, said lever is moved radially away from contact with said holding pin.

4. The motor of claim 2 wherein said holding pin includes an inclined front face, said lever riding on said holding pin front face and being moved in an axial direction away from said wall when said lever is being moved into said mounting position.

5. The motor of claim 1 wherein said release pin includes an inclined front face at its end portion.

6. The motor of claim 1 wherein said lever comprises a leaf spring having a distal end and a mounting axis end, said lever resting against said means for holding said lever when in said mounting position,
   and said release pin contacting said lever between said distal end and said mounting axis end.

7. The motor of claim 1 wherein said movable wall portion comprises a circular diaphragm with said release pin projecting from said diaphragm.

8. An electric motor, or the like, comprising:
   a housing for rotatably supporting an armature;

a collector mounted in said housing;

at least one brush resiliently mounted in said housing;

means in said housing for arresting said brush in a mounting position;

said housing including a wall having at least a portion which is moveable, whereby when said moveable portion is moved in a predetermined direction, said brush is freed from said mounting position, said brush when freed from said mounting position being movable to an operating position in resilient contact with said collector.

9. Apparatus in accordance with claim 8, wherein said wall comprises an end shield of said housing, said end shield being formed of plastic material.

10. Apparatus in accordance with claim 8, wherein said wall comprises an end shield, and said apparatus further comprises a lever swivelably mounted on said end shield and carrying said brush, said lever being biased to urge said brush into radial engagement with said collector, said lever being retainable in said maounting position by said arresting means.

11. Apparatus in accordance with claim 10, wherein said arresting means comprises a detent carried by said movable portion of said wall which engages said lever in said mounting position and wherein displacement of said moveable portion of said wall in said predetermined direction said detent is moved out of the swiveling range of said lever.

12. Apparatus in accordance with claim 10, wherein said movable portion and said lever cooperate whereby displacement of said moveable portion in said predetermined direction moves said lever in a direction deviating from its swivel direction and out of engagement with said arresting means, thereby releasing said lever from said mounting position.

13. Apparatus in accordance with claim 12, wherein said arresting means comprises a holding pin projecting from said end shield and extending into the swiveling range of said lever, and whereby pressure exerted on the outside of said end shield in the area of said portion moves said portion in said predetermined direction to thereby move said lever to a distance from said end shield greater than the length of said holding pin.

14. Apparatus in accordance with claim 13, further comprising a release pin integrally formed on said moveable portion and having a front face upon which said lever in said mounting position rests under axial prestress.

15. Apparatus in accordance with claim 13, wherein said holding pin has a front face rising in an approximately radial direction from the inside to the outside, said lever riding on said front face and being moved in an axial direction away from said end shield when being brought to said mounting position.

16. Apparatus in accordance with claim 14, wherein said lever comprises a leaf spring, said leaf spring rests upon said front face when in said mounting position, said release pin disposed between said holding pin and the mounting point of said lever.

17. Apparatus in accordance with claim 10, comprising a release pin integrally formed with said moveable portion, said arresting means comprising a detent formed on said release pin and adapted to engage said lever and whereby pressure exerted from outside said end shield on said moveable portion moves said detent in an axial direction out of engagement with said lever.

18. Apparatus in accordance with claim 10, comprising a pin integrally formed on said moveable portion, said arresting means comprising of surface of said pin, said pin being swivelable out of engagement of said lever.

19. Apparatus in accordance with claim 13, wherein said moveable portion is in the form of a circular diaphragm and said release pin is formed on the center of said circular diaphragm.

20. Apparatus in accordance with claim 8, wherein substantially all of said wall serves as a flexible diaphragm portion.

* * * * *